United States Patent
Chen et al.

(10) Patent No.: US 8,255,631 B2
(45) Date of Patent: Aug. 28, 2012

(54) PRIORITY-BASED PREFETCH REQUESTS SCHEDULING AND THROTTLING

(75) Inventors: Lei Chen, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

(21) Appl. No.: 12/024,389

(22) Filed: Feb. 1, 2008

(65) Prior Publication Data
US 2009/0199190 A1 Aug. 6, 2009

(51) Int. Cl.
*G06F 12/00* (2006.01)
*G06F 9/00* (2006.01)

(52) U.S. Cl. ............... 711/137; 711/E12.004; 712/225

(58) Field of Classification Search .............. 711/137, 711/E12.004; 712/225
See application file for complete search history.

(56) References Cited

U.S. PATENT DOCUMENTS

| | | | |
|---|---|---|---|
| 5,850,150 A | 12/1998 | Mitra | |
| 5,956,039 A | 9/1999 | Woods | |
| 7,958,316 B2 * | 6/2011 | Speight et al. | 711/137 |
| 2003/0033461 A1 | 2/2003 | Malik | |
| 2006/0095677 A1 * | 5/2006 | Hakura et al. | 711/137 |
| 2006/0248280 A1 * | 11/2006 | Al-Sukhni et al. | 711/137 |
| 2007/0043907 A1 * | 2/2007 | Diefendorff | 711/137 |
| 2007/0283101 A1 * | 12/2007 | El-Essawy et al. | 711/137 |
| 2007/0294482 A1 * | 12/2007 | Kadambi et al. | 711/137 |
| 2009/0049256 A1 * | 2/2009 | Hughes et al. | 711/158 |

* cited by examiner

*Primary Examiner* — Kevin Ellis
*Assistant Examiner* — Mehdi Namazi
(74) *Attorney, Agent, or Firm* — Yudell Isidore Ng Russell PLLC (57) ABSTRACT

A method, processor, and data processing system for implementing a framework for priority-based scheduling and throttling of prefetching operations. A prefetch engine (PE) assigns a priority to a first prefetch stream, indicating a relative priority for scheduling prefetch operations of the first prefetch stream. The PE monitors activity within the data processing system and dynamically updates the priority of the first prefetch stream based on the activity (or lack thereof). Low priority streams may be discarded. The PE also schedules prefetching in a priority-based scheduling sequence that corresponds to the priority currently assigned to the scheduled active streams. When there are no prefetches within a prefetch queue, the PE triggers the active streams to provide prefetches for issuing. The PE determines when to throttle prefetching, based on the current usage level of resources relevant to completing the prefetch.

23 Claims, 5 Drawing Sheets

PRIORITY-BASED PREFETCH REQUESTS SCHEDULING AND THROTTLING

GOVERNMENT RIGHTS

This invention was made with United States Government support under Agreement No. HR0011-07-9-0002 awarded by DARPA. The Government has certain rights in the invention.

BACKGROUND OF THE INVENTION

1. Technical Field

The present invention relates generally to data processing systems and more particularly to fetching data for utilization during data processing. Still more particularly, the present invention relates to data prefetching operations in a data processing system.

2. Description of Related Art

Conventional computer systems are designed with a memory hierarchy comprising different memory devices with increasing access latency the further the device is away from the processor. The processors typically operate at a very high speed and are capable of executing instructions at such a fast rate that it is necessary to prefetch a sufficient number of cache lines of data from lower level cache (and/or system memory) to avoid the long latencies when a cache miss occurs. Thus, prefetching provides an effective way to hide ever increasing memory latency from the execution engine. Prefetching ensures that the data is ready and available when needed for utilization by the processor.

Conventional hardware-based prefetch operations involve a prefetch engine that monitors accesses to the L1 cache and, based on the observed patterns, issues requests for data that are likely to be referenced in the future. If the prefetch request succeeds, the processor's request for data will be resolved by loading the data from the L1 cache on demand, rather than the processor stalling while waiting for the data to be fetched/returned from lower level memory.

Typically, when prefetching data, the prefetch engines utilize some set sequence and a stride pattern to identify a stream of cache lines to be fetched. A "prefetch stream" may refer to a sequence of memory addresses (and specifically the associated data blocks), whose data are prefetched into the cache using the detected prefetch pattern.

To increase the memory-level parallelism and eventually exploit instruction-level parallelism, a prefetch engine is typically capable of detecting multiple concurrent streams, and the prefetch engine issues multiple prefetch requests at once to overlap the long fetch latency of prefetch requests. Different prefetch requests have different impact on the overall performance. However, conventional prefetch engines normally issue the prefetch requests in a fixed order, which makes the prefetch engine unable to maximize the performance potential of prefetch requests.

Though many techniques have been proposed to improve prefetch accuracy, there has been little work on how to schedule prefetch requests in an optimal way. One proposed approach involves using the compiler to detect prefetch requests on the critical path and assign these prefetch requests with a higher priority than other prefetch requests that are not on the critical path. This approach is limited to software-based prefetch mechanisms and uses only two different priority levels (i.e., critical and non-critical).

As the speed gap between the processor and the memory increases, prefetch requests must be issued farther ahead to cover the increasing memory latency. However, prefetching farther ahead may potentially bring in useless data into the processor caches and pollute the processor caches. The processor-speed gap makes it possible that the processor issues memory requests in a rate that is faster than can be handled by the memory system.

SUMMARY OF THE INVENTION

Disclosed are a method, processor, and data processing system for implementing a framework for priority-based scheduling and throttling of prefetching operations. A prefetch engine (PE) assigns a priority to at least a first prefetch stream indicating a relative priority for scheduling a prefetch operation of the first prefetch stream. The PE monitors one or more activity within the data processing system relevant to a determination of changes in the priority of the first prefetch stream, and the PE dynamically updates the priority of the first prefetch stream based on an occurrence of one or more activity relevant to updating the priority. The PE also schedules prefetching of the first prefetch stream in a scheduling sequence that corresponds to the priority that is currently assigned to the first prefetch stream, relative to a next priority assigned to other prefetch streams.

In one embodiment, the PE dynamically determines whether to throttle issuance of a prefetch based on a current usage level of resources relevant to completing the prefetch. When the prefetch is at the top of the scheduling sequence and the current usage level of resources is at a level below a threshold level, the PE issues the prefetch of the first prefetch stream. Also, in another embodiment, when there are no prefetches within a prefetch queue, the PE triggers the active streams to provide prefetches for issuing.

All features and advantages of the present invention will become apparent in the following detailed written description.

BRIEF DESCRIPTION OF THE DRAWINGS

The illustrative embodiments will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, processor, and data processing system for implementing a framework for priority-based prefetch scheduling and throttling mechanisms.

Within the described framework, each prefetch stream or each prefetch request is associated with a priority value among multiple possible priority values. The priority of each prefetch stream may be initiated through software and/or hardware. Also, the prefetch engine may dynamically adjust the priority. The scheduler of the prefetch engine uses the priority to decide (i) the order of prefetch requests to be issued, (ii) the prefetch distance (how far ahead) for each stream, and (iii) which prefetch requests to issue, discard, or delay when the system becomes or is becoming overloaded.

With the described embodiments, the prefetch engine prioritizes prefetch streams taking into consideration the likelihood and the extent for a stream to impact the overall performance when the stream's prefetch requests are not serviced in a timely manner. The framework enables the prefetch engine to provide an initial priority to each stream and then adjust the priority through hardware, software, or hardware-software hybrid mechanisms. As a part of the framework, components within the processing system have the functional capability to provide the prefetch engine with information about current usage of certain monitored resources.

When implemented, the framework enables the following qualities/characteristics of the prefetch engine: (1) the prefetch requests that will most impact the system's performance are scheduled before the requests that will have less performance impact; (2) the more important prefetch requests are prefetched farther than other less important prefetch requests; and (3) the prefetch engine includes logic for (a) issuing the most important prefetch requests first, (b) cancelling the least important prefetch requests, based on some resource usage/availability analysis, and (c) delaying the borderline important prefetch requests via throttling.

Figure 1:
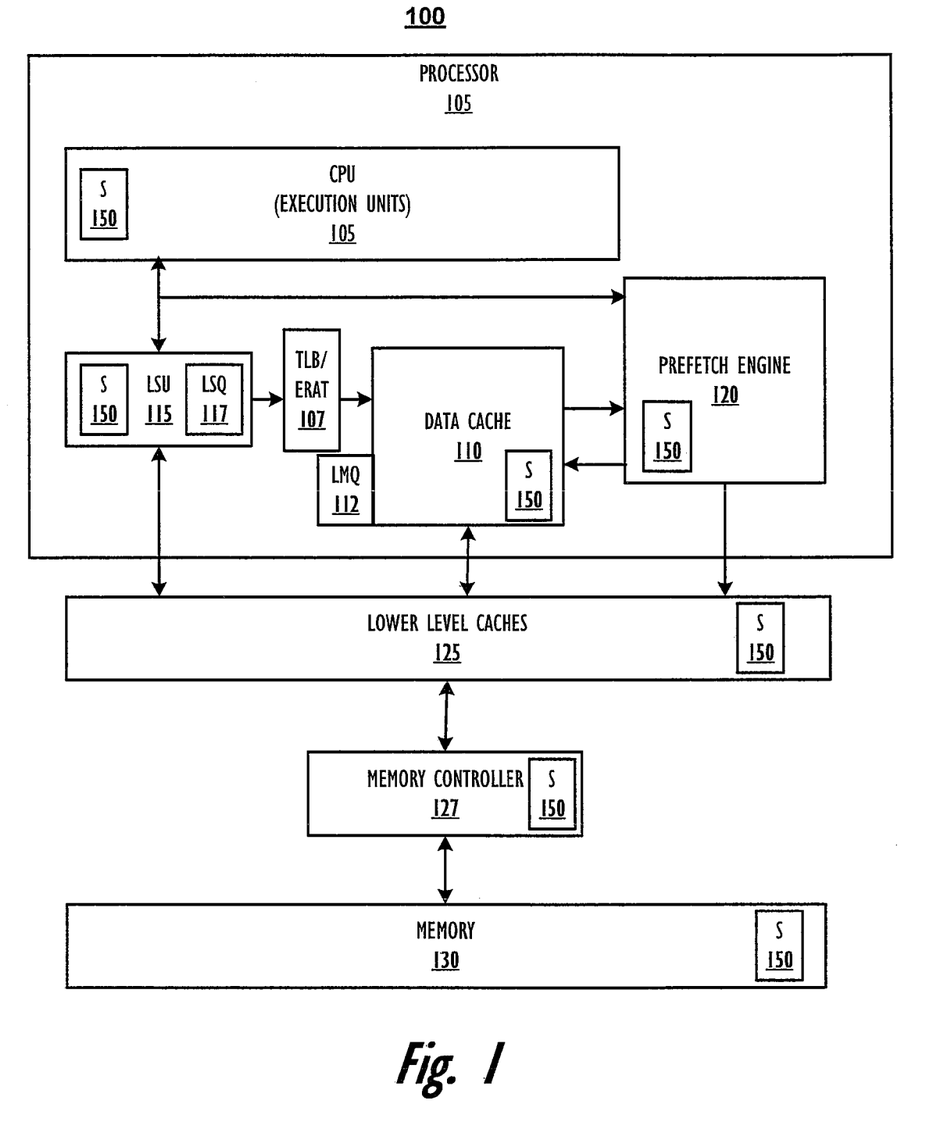
FIG. 1 is a block diagram of a data processing system with components utilized to schedule and throttle data prefetches, in accordance with one embodiment.

Referring now to the drawings and in particular to FIG. 1, there is depicted a block diagram of a data processing system, within which the various features of the invention may be implemented, in accordance with the described embodiments. Data processing system 100 comprises at least one central processing unit (CPU) 105 (or processor). CPU 105 includes various execution units, registers, buffers, memories, and other functional units. More particularly, CPU 105 includes various execution units that request/demand and consume data. In one embodiment of the present invention, CPU 105 is one of the PowerPC® line of microprocessors, which operates according to reduced instruction set computing (RISC) techniques.

CPU 105 connects to and communicates with a memory hierarchy that includes an L1 data cache 110, one (or more) lower level caches 125, and memory 130 and associated memory controller 127. Memory controller 127 controls accesses to memory 130. As will become clear below, L1 data cache 110 serves as a prefetch buffer for data (and/or data streams) that are pre-fetched. In the illustrative embodiment, L1 data cache has a corresponding load miss queue (LMQ) 112, which the cache utilizes to save information about ongoing prefetch requests. Lower level caches 125 may comprise a single level two (L2) cache or multiple other sequentially number lower levels, e.g., L3, L4. In addition to the illustrated memory hierarchy, data processing system 130 may also comprise additional storage devices that form a part of memory hierarchy from the perspective of CPU 105. The storage device may be one or more electronic storage media such as a floppy disk, hard drive, CD-ROM, or digital versatile disk (DVD). CPU 105 communicates with each of the above devices within the memory hierarchy by various means, including via busses and/or direct channels.

Load store unit (LSU) 115, coupled to CPU 105, includes a load/store queue (LSQ) 117, and issues memory access operations (loads and stores) that retrieves prefetched data or causes the data to be fetched from the memory subsystem. A prefetch engine (PE) 120 is coupled to LSU 115 via a translation mechanism 107, indicated as a translation lookaside buffer (TLB) or an effective to real address table (ERAT).

As provided by the illustrative embodiment of FIG. 1, data processing system 100 includes a plurality of sensors (or monitors) 150, which are associated with specific ones of the above described hardware components. As will become clearer below, these sensors 150 detect current system parameters relevant for determining a current system (resource) usage/loading and providing the detected system parameters to a throttling logic (250, FIG. 2) within the PE 120. In one embodiment, the sensors 150 are implemented as microcode, which retrieve usage information of the monitored components/parameters and forwards the information from the various components to the PE 120.

As illustrated, CPU 105, L1 data cache 110, LSU 115, L2 cache 120 and memory 130 each have a sensor 150. However, these sensors 150 may each be differently configured, based on which component the sensor 150 monitors. Also, while the illustration indicates that both memory 130 and memory controller 127 have separate sensors 150, it is appreciated that the memory controller 117 intrinsically has knowledge of the operational state of the memory 130, eliminating the need for a separate sensor 150 within memory 130. Also, while multiple distributed sensors are shown, other embodiments may entail the use of a single sensor monitoring one or more critical components (e.g., prefetch machines, memory 130 or L1 data cache 110) that are representative of components that affect or are affected by prefetching operations. Sensor 150 is not necessarily a hardware construct (e.g., microcode of the component/system).

Those skilled in the art will further appreciate that while a particular configuration of data processing system 100 is illustrated and described, it is understood that other configurations may be possible, utilizing functional components within and/or associated with the data processing system to achieve the same functional results. The illustrative embodiments contemplates that all such configurations fall within the scope of the embodiments and their equivalents.

Also, while the illustrative embodiments have been, and will continue to be, described in the context of a fully functional data processing system, those skilled in the art will appreciate that the software aspects of an illustrative embodiment are capable of being distributed as a program product in a variety of forms, and that an illustrative embodiment applies equally regardless of the particular type of media used to actually carry out the distribution.

Also, it is understood that the use of specific parameter names are for example only and not meant to imply any limitations on the invention. The invention may thus be implemented with different nomenclature/terminology utilized to described the various parameters (e.g., logic, tables, and the like), without limitation.

The framework of the illustrative embodiments may be implemented in both a hardware-implemented prefetch (involving generation of the prefetch requests by the prefetch engine based on detected memory access operations issued by the processor) and a software-based prefetch method (compiler provided prefetch instructions in the instruction stream). Logic within the PE 120 then determines a prefetch stream and schedules the prefetch stream to prefetch multiple sequential blocks of data with a determined stride pattern. The CPU 115 subsequently executes the corresponding load (or other memory access) instruction that instructs the LSU 115 to load the data from the data cache 110 into one of the CPU's execution registers. To load the data, the LSU 115 issues a memory access request (e.g., a read/write) to the data cache 110.

PE 120 includes logic that enables the various enhanced prefetching features of the embodiments described herein. As utilized herein, the term prefetching refers to the method by which data that is stored in one memory location of the memory hierarchy (e.g., system memory 130) is transferred to a higher level memory location (e.g., L1 data cache 110) that is closer (yields lower access latency) to the CPU 105, before the CPU 105 actually requests/demands the data. More specifically, prefetching as described hereinafter, refers to the early issuance of a prefetch request to provide early retrieval of data from lower level memory 130 to the data cache 110, where the prefetch request completes before the CPU 105 provides a demand for the specific data being returned.

Figure 2A:
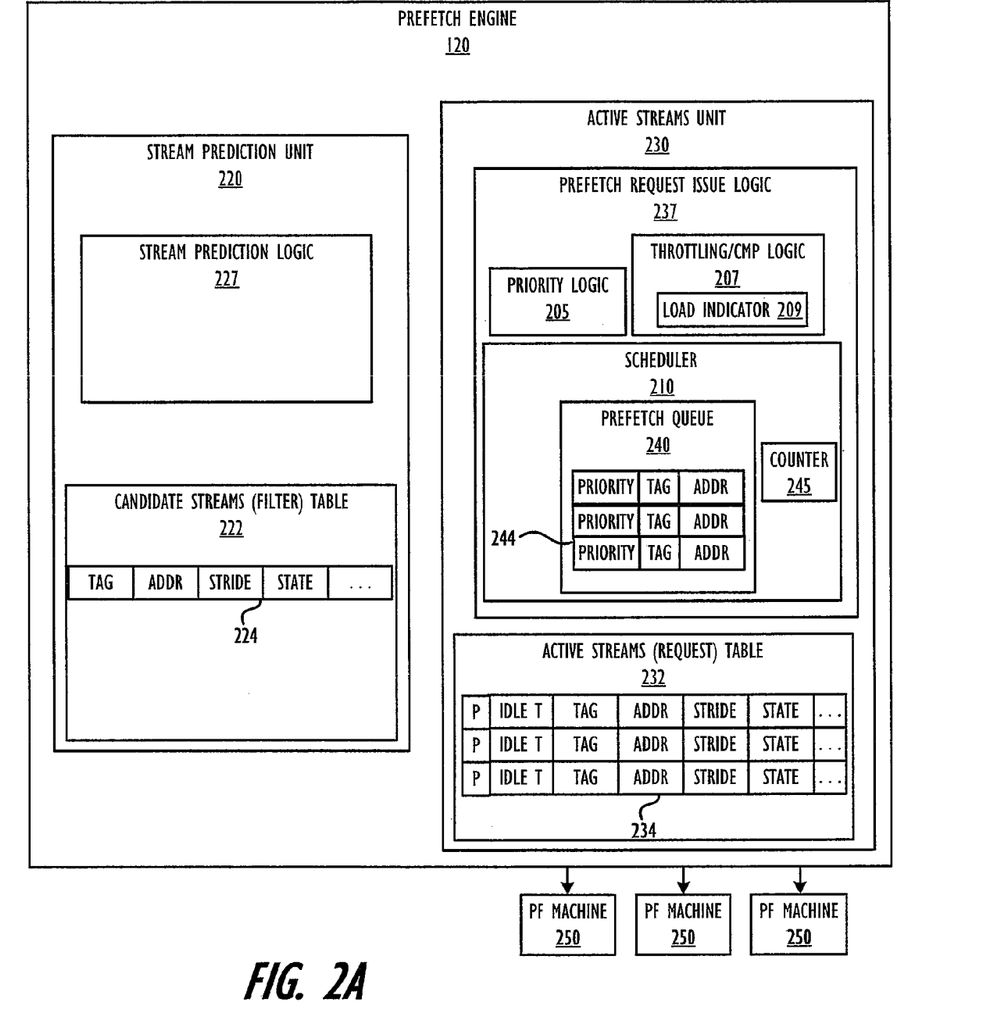
FIG. 2 is a block diagram depicting internal components (logic) of the prefetch engine of FIG. 1, according to one embodiment.

FIG. 2 is a block diagram illustrating additional components of an example prefetch engine (PE) 120 utilized for establishing prefetch streams, prioritizing the prefetch streams for scheduling, based on the assigned priority, as well as throttling prefetching, where necessary, based on current usage of specific components. PE 120 includes reference/stream prediction unit 220, which includes reference prediction (or candidate streams) table 222 and reference/stream prediction logic 227. Stream prediction table 222 includes one or more entries of historical data 224 of previous references, which may be utilized by PE 120 to identify new streams for prefetching. Reference/stream prediction logic 227 utilizes the historical data entries 224 to predict future prefetch streams based on issued references. Specifically, the stream prediction logic 227 utilizes reference prediction table 222 to store a certain number of previous references in each entry and initiate an active stream if the prediction logic 227 detects some pattern.

PE 120 also comprises active streams unit 230, which includes active streams table 232 and prefetch request issue logic 237. PE 120 and specifically active streams table 232 concurrently maintains information about multiple, independent prefetch streams. Three entries of active streams information (i.e., show collectively as entries 234 of active prefetch stream information) are illustrated within active streams table 232, representing different streams that the PE 120 currently prefetches.

The active streams table 232 keeps track of all active prefetch streams. Each prefetch stream is assigned with a unique ID (tag) and a priority (see streams table 232). The priority value of each stream is added within a priority entry of the particular prefetch stream's information (234), which is stored within active streams table 232. Each stream starts with a predefined initial (default) priority, which the prefetch engine dynamically updates by increasing or decreasing the priority. In one embodiment, the priority is implemented as a saturating counter.

Figure 2B:
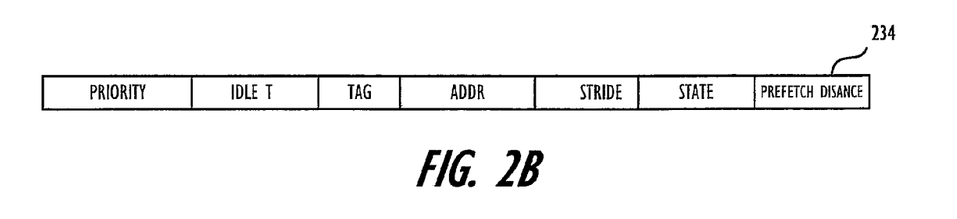

FIG. 2B illustrates some of the fields within an example stream 234 within active streams table 232. In addition to a priority entry, each prefetch stream 234 includes an idle timer entry, and a prefetch distance entry. In one embodiment, the idle timer is a fixed-width timer. The idle timer is reset to 0 whenever the stream initiates a prefetch request. The prefetch distance keeps track of how many prefetch requests the stream has issued ahead. As described below, when the scheduler 205 asks for the active streams table 232 to initiate prefetch requests to an empty prefetch queue 240, only those high priority streams that have not reached the maximum prefetch distance will issue more prefetch requests.

According to the embodiments described herein, prefetch request issue logic 237 sends out prefetch requests at times determined by a dynamically adjusting schema that enables optimal use of the prefetch functionality to ensure that: (1) the most critical (highest priority) data (e.g., data utilized within the critical pipeline) are prefetched ahead of less critical (lower priority) data; (2) prefetches that return higher priority data are tag for priority scheduling to enable higher priority data to be returned ahead of other data; (3) prefetch streams for data that are very low priority are removed from the prefetch engine to allocate those resources for prefetching stream with higher priority data; and (4) the prefetch engine provides throttling of prefetches based on the current availability and usage of monitored resources. During throttling, the prefetch engine chooses which prefetch requests to issue, which prefetch requests to delay, and which prefetch requests to drop. Under ideal conditions, the prefetch request issue logic 237 implements a dynamically adjusting prefetch scheduling schema whereby all higher priority data are returned at substantially the time just before the processor issues a demand load for that data, so that no cache miss occurs for critical data, while other non-critical data are also returned based on the level of priority. The priority is assigned from among multiple possible levels available for assignment.

In the depicted embodiment, prefetch request issue logic 237 comprises (or is represented as) three (or more) different, but interrelated, functional logic, namely a first logic, scheduler 210, a second logic, priority logic 205, and third logic, throttling logic 207. First, second and third logic operate together to provide the above described dynamically adjusting prefetch scheduling scheme, as well as other functions performed by the PE 120.

Scheduler (or scheduling logic) 210 performs the basic scheduling of the multiple streams for issuance to the memory subsystem or the lower level caches based on information about the different streams (e.g., priority) and the system's current prefetch load, as provided by the other logic components. As utilized herein, the system's prefetch load refers to system data returned by the sensors 150 about the current usage level of resources affected by or which affect the completion of prefetch operations. Among the resources that are monitored are prefetch machines 250, and prefetch counter 245. Prefetch machines 250 actually perform the prefetch operations in the memory subsystem and are individually allocated to complete an issued prefetch. The prefetch counter 245 tracks the total number of prefetches currently being performed in the memory subsystem.

Priority logic 205 determines a priority of each prefetch stream. Priority logic 205 also assigns the determined priority to the particular stream. In one embodiment, priority logic assigns an initial priority value to each new stream (or prefetch) based on information received about the stream. The information may be related to the critical nature of the data being prefetched (i.e., in the critical or non-critical path), and/or the information may pertain to the number or frequency of misses recorded for previously fetched data in that particular stream of prefetched data. The prefetch engine then dynamically adjusts the priority of the stream as conditions change, while the stream continues to be scheduled.

To simplify the description of the priority values, an illustrative embodiment provides a numerical range of priorities, specifically values 0 though 3, with priority assigned in ascending order (i.e., where 3 represents the highest priority and 0 represents the lowest priority). With this four level priority scheme, the priority value may be represented as two bits, with the values ranging from 00 to 11 (binary). Also, as an example embodiment, the following assignments are assumed: 00—very low priority (stream capable of being discarded); 01 low priority—schedule when resources available/free; 10—high priority—schedule ahead of most prefetches at a higher periodicity than a low priority prefetch; and 11—extremely high priority—schedule ahead of all other prefetches except other high priority prefetches. When two or more prefetches share a same priority value, the scheduler 210 schedules the prefetches in the order the prefetches were placed in the scheduling queue, and each prefetch gets schedule at a same frequency as the other prefetches sharing the same priority value.

Returning to FIG. 2, throttling logic 207 operates in tandem with the sensors 150 to monitor the availability and/or usage of specific system resources, (such as memory, L1 cache space, processor consumption rate for returned data, for example). Throttling logic 207 then determines, based on the detected current resource usage data, whether to enable the prefetch engine to issue prefetchs and the rate at which the prefetch engine 120 may issue prefetch requests to the memory subsystem or the lower level caches. Specifically, throttling logic calculates a load indicator, whose value is stored within load indicator register 209. In one embodiment, throttling logic assigns a usage factor (e.g., from 0-3 (00-11, binary)) based on the level of current usage detected. With this scale for the usage factor, the throttling value may be assigned as follows: 00—little usage, not throttling of prefetching; 01—some usage, very little throttling required; 10—lots of usage; throttle lower priority prefetches; and 11—heavy usage; prevent all prefetches.

As utilized herein, the term logic refers to one or a combination of software utility and/or pseudo code and hardware registers and functional components. Also, logic may refer to a singular construct or a plural construct, such that multiple different logic within the PE 120 perform different parts of the functions involved in scheduling the streams and the other functions described herein. Generally, the logic operates to ensure that data prefetch operation for a particular stream completes (i.e., returns the fetched cache line(s) to the data cache 115) at substantially the time (or clock cycle) right before the processor issues a demand for that cache line data. The functionality provided by the described and illustrated embodiments enables the various logic within PE 120 to implement priority scheduling of multiple prefetch streams (and/or prefetchs), and throttling of prefetching operations, as required. In one embodiment, the logic also enables cancellation of a low priority prefetch.

Figure 3:
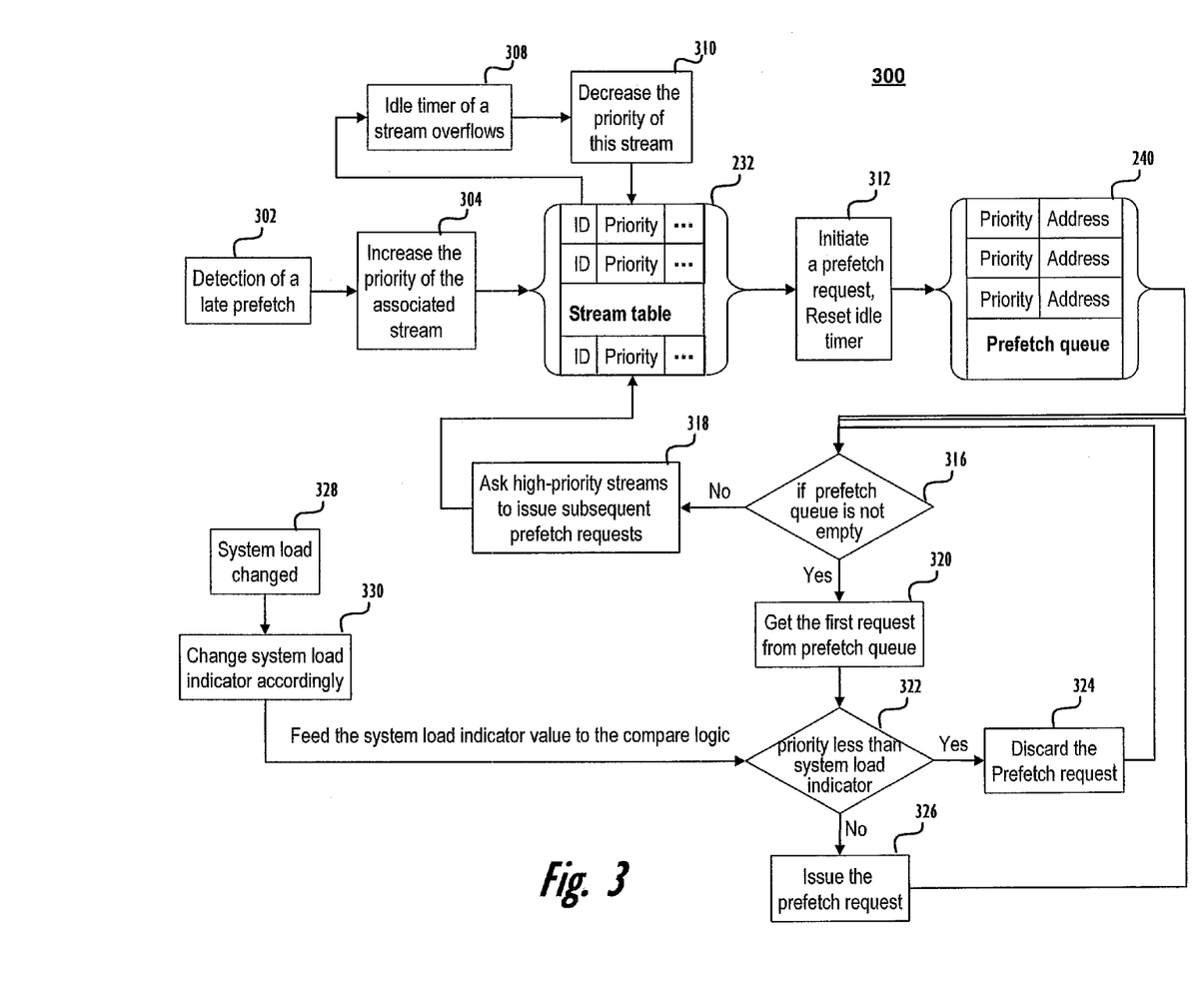
FIG. 3 provides a framework representing functions performed by the prefetch engine during priority based scheduling and throttling of prefetch operations, according to one embodiment.

FIG. 3 illustrates an example prefetching framework, within which many of the features of the described embodiments may be implemented, according to the embodiments. Prefetching framework 300 comprises/performs/enables a set of logic operations (or functions) within a prefetch engine (e.g., prefetch engine 120), and the framework 300 is interchangeably referred to as prefetch engine 120 when representing a function performed by/within the prefetch engine 120. Each function or operation is represented by a processing block with a corresponding reference numeral associated therewith.

As shown, prefetching framework 300 has two signals entering the prefetch engine 120. These signals are (1) a detection of a late prefetch request (block 302) and (2) a change in the system loading (block 330). A late prefetch occurs when prefetched data is demanded by the CPU (processor core) before the prefetch request completes (i.e., before corresponding data are returned to the L1 data cache). A change in the system load is signaled to the prefetch engine 120 when the usage of resources being monitored changes. For instance, in one embodiment, the resource(s) being monitored include (a) the number of free prefetch machines available and (b) the number of outstanding requests in the system. When the prefetch engine 120 receives a signal indicating a change in the system load, the prefetch engine changes the system load indicator accordingly (block 328). The prefetch engine 120 then feeds the system load indicator value to a compare logic (within throttling logic 207) that evaluates when (or how much) to throttle the prefetch engine's issuing of prefetch requests.

At block 304, the prefetch engine 120 increases the priority of a stream (associated with the later prefetch) if a certain number of previously-issued prefetch requests of this stream are late (block 302) within a first, preset number of cycles (called a window). The priority decreases (block 310) if the stream initiates fewer prefetch requests than a predefined decrease threshold in a second, preset number of cycles.

In the described embodiment, the late prefetch signal to the prefetch engine 120 includes the stream ID of the late prefetch request. Each late prefetch signal triggers the prefetch engine 120 to increment the priority of the associated stream by one. When the idle timer overflows, i.e., there is no prefetch request initiated by this stream within the maximum number of cycles that the idle timer can represent (block 308), the priority of the stream is decreased by one (block 310), and the idle timer is reset to 0.

In one embodiment, the system load indicator contains a numeric value in the same range as the stream priority. A higher value indicates that the system is more heavily loaded. The prefetch engine 120 converts raw signal values from the system into corresponding system load indicator values. The prefetch engine 120 then adjusts the system load indicator's value according to the system load signal.

When the prefetch is initiated, the prefetch engine 120 resets the idle timer of the stream (block 312) and the prefetch engine 120 places the prefetch into the prefetch queue 240. The prefetch queue 240 holds the prefetch requests that have been initiated but have not been issued. Requests in the prefetch queue 240 are sorted based on priority in descending order, where prefetches at the top of the prefetch queue 240 are issued first. Requests having the same priority are sorted based on initiating time in ascending order.

The prefetch engine 120 checks whether the scheduling queue is empty (block 316). When the prefetch queue 240 is empty, the scheduler 205 will attempt to issue some prefetch requests for the high-priority streams. The scheduler 205 triggers/requests the high priority streams issue their next prefetch requests (block 318).

When the prefetch queue is not empty (block 316), the prefetch engine 120 will first remove the head request, i.e., the request with the highest priority (block 320). The scheduler 205 then checks if the priority of the removed request is smaller than the system level indicator (block 322). If the priority is smaller than the system level indicator, the scheduler 205 does not issue the prefetch and/or may simply discard the request (block 324). If the priority is not smaller, the scheduler 205 issues the prefetch request to the system (block 326). With the above described examples in which two bits are assigned to track each parameter value (i.e., 00-11), the comparison compares the current values of the two parameters, and the prefetch engine 120 performs the prefetch only when the value of the system level indicator is smaller than the priority value.

When the scheduler 205 asks for the active streams table 232 to initiate prefetch requests to an empty prefetch queue 240, only those high priority streams that have not reached the maximum prefetch distance will issue more prefetch requests.

Figure 4:
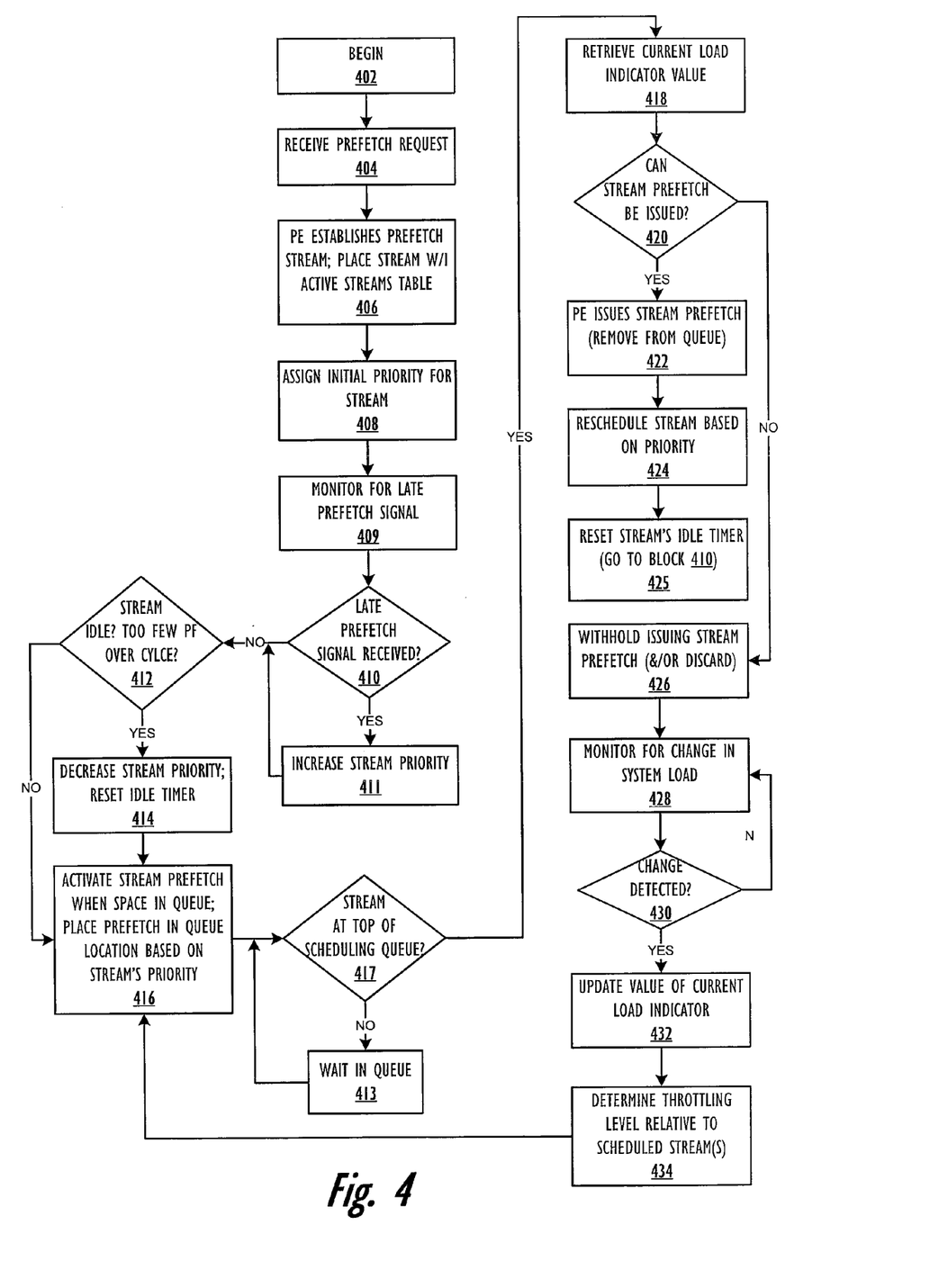
FIG. 4 is a high level logical flowchart of the method for scheduling and throttling prefetching operations, in accordance with the described embodiments.

FIG. 4 provides a flow chart of the method by which the above processes may be implemented according to one embodiment. The description of the flow chart includes some overlaps with the corresponding description of the functions provided by the framework of FIG. 3. However, the method of the flow chart is intended to more cohesively describe the processes performed from the perspective of the prefetch engine.

In the described embodiment, several of the functionalities provided by the method are implemented by one or more of scheduler 210, priority logic 205, and/or throttling logic 207, operating/executing within PE 120. However, for simplicity, the method is generally described from the perspective of the PE 120, which encompasses all of the logic components, tables, queues and other components/devices illustrated and described herein.

The method process begins at block 402 and proceeds to block 404 at which the prefetch engine receives a prefetch request. At block 406, the prefetch engine, using information about the prefetch request, establishes a prefetch stream associated with the prefetch request and places the prefetch stream within the active streams table. The prefetch engine also assigns an initial priority and an idle timer to the prefetch request, as shown at block 408.

Prefetch engine monitors for new prefetch requests as well as signals indicating a late prefetch at block 409, and at decision block 410, prefetch engine determines if a late prefetch request signal was received for the prefetch stream within the active streams table. If a late prefetch request signal is received for the stream, the prefetch engine 120 increases the priority of the stream, at block 411. In one embodiment, the prefetch engine increases the stream's priority only after (a) a pre-established number of prefetch requests of the stream are late or (b) the pre-established number of late prefetches for the stream occur within a first, preset number of cycles.

The prefetch engine also determines at block 412 whether the stream initiates fewer prefetches than a predefined threshold number (within a second set number of cycles), indicating the stream's idleness. When the stream initiates fewer than the predefined threshold number of prefetches, the prefetch engine decreases the priority of the stream, as provided at block 414. The prefetch engine 120 also resets the idle timer. In one embodiment, the prefetch engine 120 relies on the idle timer to track the above metric, and the prefetch engine 120 decreases the stream's priority when the idler timer overflows.

At block 416, prefetch engine 120 activates the stream for prefetch scheduling, and the prefetch engine 120 places the stream's next prefetch in the scheduling queue at a queue position determined based on the stream's current priority, relative to the priority of the other streams that are concurrently scheduled within the scheduling queue. The prefetch engine 120 also reset the idle timer. When, as determined at block 417, the stream reaches the top of the scheduling queue (i.e., the stream's prefetch is the next in line to be issued), the prefetch engine retrieves a current load indicator value, at block 418, and determines, at block 420, whether the stream's prefetch can/should be issued. In one embodiment, the prefetch engine compares the streams priority value against the system load indicator, where both values utilize a similar range of values for comparison.

When the current load indicator does not cause the prefetch engine to withhold issuing the prefetch (e.g., the prefetch stream's priority value is larger than the value of the load indicator), the prefetch engine issues the prefetch, as shown at block 422. The prefetch engine then reschedules the stream in the scheduling queue, based on the stream's priority, relative to other streams, as shown at block 424. The prefetch engine 120 also resets the idle timer of the stream, at block 425.

Returning to decision block 420, when the current load indicator has a value that causes the prefetch engine 120 (scheduler) to not issue the stream's prefetch, the prefetch engine 120 withholds issuing the prefetch, as shown at block 426. In one embodiment, when the priority is smaller than the system level indicator, the scheduler 205 simply discards the prefetch request. At block 428, the prefetch engine 120 monitors for a signal indicating a change in the system load. If, as determined at block 430, the prefetch engine 120 receives such change information, the prefetch engine 120 updates the value of the current load indicator, at block 432. The prefetch engine 120 then feeds the updated system load indicator value to the compare logic, which evaluates to what extent the prefetch engine should throttle the prefetch engine's issuing of the queued prefetch requests, as shown at block 434.

Figure 5:
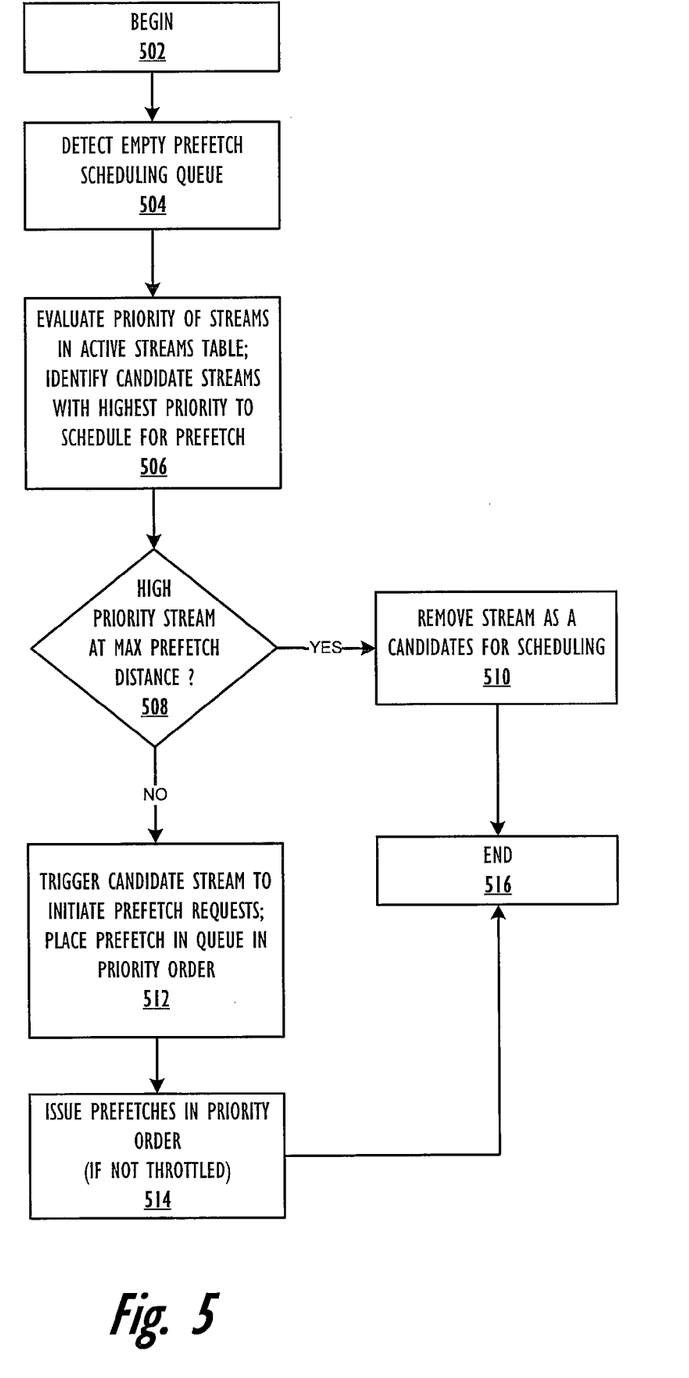
FIG. 5 is a high level logical flowchart of the method by which the prefetch engine selects streams to place in the scheduling queue, in accordance with one embodiment.

FIG. 5 illustrates the method by which the prefetch engine 120 responds to detecting an empty scheduling queue. The process begins at block 502 and proceeds to block 504 at which the prefetch engine detects that the prefetch queue 240 is empty. At block 506, the prefetch engine evaluates the streams within the active streams table to determine which streams have the highest/higher priority. For each of the high priority streams, identified as candidate streams, the prefetch engine 120 determines at block 508 whether the high priority stream has reached the stream's maximum prefetch distance (stored along with stream information within the active streams table).

Returning to the flow chart, when a candidate stream has reached the stream's maximum prefetch distance, the prefetch engine 120 excludes the stream from scheduling a next prefetch, as provided at block 510. For those high priority streams that have not reached their maximum prefetch distance, the prefetch engine 120 triggers these higher priority streams to initiate their next prefetches by placing the high(er) priority stream's next prefetch request in the scheduling queue, as shown at block 512. The prefetch engine 120 orders the prefetches within the queue based on the priority values assigned to the streams. Then, at block 514, the prefetch engine 120 issues the prefetches in the priority order (as queued), assuming the prefetch engine does not throttled the prefetch due to resource constraints. Then, the process ends at termination block 516.

As provided by the above description, the illustrative embodiments enable the following functional improvements to prefetching: First, requests in the prefetch queue are sorted based on the priority and initiating time. Second, a mechanism to discard prefetch requests whose importance is too lower to warrant the prefetch's positive impact with current system load. Third, a mechanism to initiate more prefetch requests when the prefetch queue is empty. Fourth, a mechanism to pass the usage of system resources related to the prefetch requests to the prefetch engine. Fifth, a mechanism to increase the stream priority on the detection of late prefetches. And, sixth, a mechanism to decrease the stream priority on the detection of idle steams. The embodiment enables the prefetch engine 120 to assign each of the active prefetch streams in the prefetch engine's active streams table 232 with a priority, and to issue prefetch requests based on the priority of their corresponding stream.

It is important to note that although the present invention has been described in the context of a data processing system, those skilled in the art will appreciate that the mechanisms of the present invention are capable of being distributed as a program product in a variety of forms, and that the present invention applies equally regardless of the particular type of computer readable medium utilized to actually carry out the distribution. Examples of computer readable media include, without limitation, recordable type computer readable media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. In a data processing system comprising a processor, and a memory subsystem with at least one cache and a lower level memory having stored data, a method comprising:

assigning a priority to at least a first prefetch stream indicating a relative priority for scheduling a prefetch operation of the first prefetch stream;

monitoring one or more activity within the data processing system relevant to a determination of changes in the priority of the first prefetch stream, said one or more activity including an availability and usage of specific system resources;

dynamically updating the priority of the first prefetch stream when the monitoring indicates an occurrence of one or more activity relevant to updating the priority assigned to the first prefetch stream;

scheduling the prefetch of the first prefetch stream in a scheduling sequence corresponding to the priority that is currently assigned to the first prefetch stream, relative to a next priority assigned to other prefetch streams with scheduled prefetches, wherein streams with higher priority are scheduled ahead of streams with lower priority; and issuing the prefetch of the first prefetch stream in response to the prefetch being in a first position in the scheduling sequence and a current usage level of resources being at a level below a threshold level at and above which the prefetch cannot be issued.

2. The method of claim 1, further comprising:

dynamically determining whether to throttle issuance of the prefetch of the first prefetch stream based on the current usage level of resources relevant to completing the prefetch;

in response to the current usage level of the relevant resources being at least at the threshold level at and above which the prefetch cannot be issued, interrupting the scheduling of the prefetch by performing one of: discarding the prefetch from the scheduling sequence; and pausing the scheduling of the prefetch until the current usage level falls below the threshold level.

3. The method of claim 1, further comprising:

in response to the first prefetch stream having a same priority as a next prefetch stream, said scheduling of the prefetch of the first prefetch stream in a scheduling sequence based on relative priority includes scheduling the prefetch of the first prefetch stream and the next prefetch of the next prefetch stream in a sequential order, relative to each other, corresponding to a time at which the first prefetch and the next prefetch are initiated and added to the scheduling sequence.

4. The method of claim 1, wherein:

said monitoring further comprises:
detecting an occurrence of one or more late prefetches for the first prefetch stream; and
tracking a level of idleness of the first prefetch stream; and said dynamically updating comprises:
responding to the detection of a preset threshold number of late prefetches by dynamically increasing the priority of the first prefetch stream to a higher priority; and
responding to the level of idleness being greater than a threshold idleness level by dynamically decreasing the priority of the first prefetch stream to a lower priority.

5. The method of claim 4, further comprising, in response to the priority of the first prefetch stream falling below a threshold priority point, automatically discarding the prefetch stream, such that no further scheduling of prefetches occur for the first prefetch stream.

6. The method of claim 1, further comprising:

detecting when a prefetch scheduling queue is empty; and
in response to the prefetch scheduling queue being empty, automatically triggering one or more prefetch streams to initiate a prefetch by placing the prefetch within the scheduling queue.

7. The method of claim 6, wherein the automatically triggering further comprises:

identifying one or more prefetch streams that have a highest priority among all available prefetch streams as possible streams for scheduling;
checking the prefetch distance of each of the possible streams;
removing streams among the possible streams whose prefetch distance is above a threshold allowed distance at which no further prefetching should be scheduled for the particular stream; and
triggering placement of a prefetch into the scheduling queue by one or more of the possible streams whose prefetch distance is not above the threshold allowed distance.

8. The method of claim 2, wherein said monitoring further comprises:

detecting a usage parameter at the resource being monitored;
forwarding the usage parameter to a throttling facility;
receiving the usage parameter at the throttling facility; and
re-calculating a usage load indicator value based on the received usage parameter.

9. A computer program product comprising:

a non-transitory type computer readable medium; and
program code on the non-transitory computer readable medium for:
assigning a priority to at least a first prefetch stream indicating a relative priority for scheduling a prefetch operation of the first prefetch stream;
monitoring one or more activity within the data processing system relevant to a determination of changes in the priority of the first prefetch stream;
dynamically updating the priority of the first prefetch stream when the monitoring indicates an occurrence of one or more activity relevant to updating the priority assigned to the first prefetch stream;
scheduling the prefetch of the first prefetch stream in a scheduling sequence corresponding to the priority that is currently assigned to the first prefetch stream, relative to a next priority assigned to other prefetch streams with scheduled prefetches, wherein streams with higher priority are scheduled ahead of streams with lower priority;
wherein in response to the first prefetch stream having a same priority as a next prefetch stream, said scheduling of the prefetch of the first prefetch stream in a scheduling sequence based on relative priority includes scheduling the prefetch of first prefetch stream and the next prefetch of the next prefetch stream in an sequential order, relative to each other, corresponding to a time at which the first prefetch and the next prefetch are initiated and added to the scheduling sequence;

dynamically determining whether to throttle issuance of the prefetch of the first prefetch stream based on a current usage level of resources relevant to completing the prefetch;

issuing the prefetch of the first prefetch stream in response to the prefetch being in a first position in the scheduling sequence and the current usage level of resources being at a level below a threshold level at which the prefetch cannot be issued; and in response to the current usage level of the resources being at least at the threshold level at which the prefetch cannot be issued, interrupting the scheduling of the prefetch by performing one of: discarding the prefetch from the scheduling sequence; and pausing the scheduling of the prefetch until the current usage level falls below the threshold level.

10. The computer program product of claim 9, wherein:
said program code for monitoring further comprises code for:
  detecting a usage parameter at the resource being monitored;
  forwarding the usage parameter to a throttling facility;
  receiving the usage parameter at the throttling facility;
  re-calculating a usage load indicator value based on the received usage parameter
  detecting an occurrence of one or more late prefetches for the first prefetch stream; and
  tracking a level of idleness of the first prefetch stream;
said program code for dynamically updating comprises code for:
  responding to the detection of a preset threshold number of late prefetches by dynamically increasing the priority of the first prefetch stream to a higher priority; and
  responding to the level of idleness being greater than a threshold idleness level by dynamically decreasing the priority of the first prefetch stream to a lower priority; and
said program code comprises code for, in response to the priority of the first prefetch stream falling below a threshold priority point, automatically discarding the prefetch stream, such that no further scheduling of prefetches occur for the first prefetch stream.

11. The computer program product of claim 9, further comprising program code for:
  detecting when a prefetch scheduling queue is empty; and
  in response to the prefetch scheduling queue being empty, automatically triggering one or more prefetch streams to initiate a prefetch by placing the prefetch within the scheduling queue, wherein the automatically triggering further comprises:
    identifying one or more prefetch streams that have a highest priority among all available prefetch streams as possible streams for scheduling;
    checking the prefetch distance of each of the possible streams;
    removing streams among the possible streams whose prefetch distance is above a threshold allowed distance at which no further prefetching should be scheduled for the particular stream; and
    triggering placement of a prefetch into the scheduling queue by the possible streams whose prefetch distance is not above the threshold allowed distance.

12. A data processing system comprising:
a central processing unit that issues requests for data;
a memory subsystem having at least one data cache and a lower level memory that stores data; and
a prefetch engine associated with the central processing unit and comprising logic which:
  assigns a priority to at least a first prefetch stream indicating a relative priority for scheduling a prefetch operation of the first prefetch stream;
  monitors one or more activity within the data processing system relevant to a determination of changes in the priority of the first prefetch stream, said one or more activity including an availability and usage of specific system resources;
  dynamically updates the priority of the first prefetch stream when the monitoring indicates an occurrence of one or more activity relevant to updating the priority assigned to the first prefetch stream;
  schedules the prefetch of the first prefetch stream in a scheduling sequence corresponding to the priority that is currently assigned to the first prefetch stream, relative to a next priority assigned to other prefetch streams with scheduled prefetches, wherein streams with higher priority are scheduled ahead of streams with lower priority; and
  issues the prefetch of the first prefetch stream in response to the prefetch being in a first position in the scheduling sequence and a current usage level of resources being at a level below a threshold level at and above which the prefetch cannot be issued.

13. The data processing system of claim 12, wherein the prefetch engine further comprises logic that:
  dynamically determines whether to throttle issuance of the prefetch of the first prefetch stream based on a current usage level of resources relevant to completing the prefetch; and
  in response to the current usage level of the resources being at least at the threshold level at which the prefetch cannot be issued, interrupts the scheduling of the prefetch by performing one of: discarding the prefetch from the scheduling sequence; and pausing the scheduling of the prefetch until the current usage level falls below the threshold level.

14. The data processing system of claim 12, the prefetch engine further comprising:
  logic that causes the prefetch engine to schedule the prefetch of first prefetch stream and the next prefetch of the next prefetch stream in an sequential order, relative to each other, corresponding to a time at which the first prefetch and the next prefetch are initiated and added to the scheduling sequence, in response to the first prefetch stream having a same priority as a next prefetch stream.

15. The data processing system of claim 12, wherein:
said logic that monitors further comprises logic that:
  that detects an occurrence of one or more late prefetches for the first prefetch stream; and
  logic that tracks a level of idleness of the first prefetch stream; and
said dynamically updating further comprises:
  logic that responds to the detection of a preset threshold number of late prefetches by dynamically increasing the priority of the first prefetch stream to a higher priority; and
  logic that responds to the level of idleness being greater than a threshold idleness level by dynamically decreasing the priority of the first prefetch stream to a lower priority.

16. The data processing system of claim 15, wherein the prefetch engine further comprises logic that, in response to the priority of the first prefetch stream falling below a threshold priority point, automatically discards the prefetch stream, such that no further scheduling of prefetches occur for the first prefetch stream.

17. The data processing system of claim 12, wherein the prefetch engine further comprises:
   logic that detects when a prefetch scheduling queue is empty; and
   logic that automatically triggers one or more prefetch streams to initiate a prefetch by placing the prefetch within the scheduling queue.

18. The data processing system of claim 17, wherein the logic that automatically triggers further comprises:
   logic that identifies one or more prefetch streams that have a highest priority among all available prefetch streams as possible streams for scheduling;
   logic that checks the prefetch distance of each of the possible streams;
   logic that removes streams among the possible streams whose prefetch distance is above a threshold allowed distance at which no further prefetching should be scheduled for the particular stream; and
   logic that triggers placement of a prefetch into the scheduling queue by the possible streams whose prefetch distance is not above the threshold allowed distance.

19. The data processing system of claim 12, wherein said logic for monitoring further comprises:
   logic that detects a usage parameter at the resource being monitored;
   logic that forwards the usage parameter to a throttling facility;
   logic that receives the usage parameter at the throttling facility; and
   logic that re-calculates a usage load indicator value based on the received usage parameter.

20. A processor chip comprising:
   a central processing unit that issues requests for data;
   at least one data cache;
   a connection mechanism for connecting to a memory subsystem from which data is retrieved during data operations; and
   a prefetch engine associated with the central processing unit and which comprises:
      logic that assigns a priority to at least a first prefetch stream indicating a relative priority for scheduling a prefetch operation of the first prefetch stream;
      logic that monitors one or more activity within the data processing system relevant to a determination of changes in the priority of the first prefetch stream, said one or more activity including an availability and usage of specific system resources; and
      logic that dynamically updates the priority of the first prefetch stream when the monitoring indicates an occurrence of one or more activity relevant to updating the priority assigned to the first prefetch stream;
      logic that schedules the prefetch of the first prefetch stream in a scheduling sequence corresponding to the priority that is currently assigned to the first prefetch stream, relative to a next priority assigned to other prefetch streams with scheduled prefetches, wherein streams with higher priority are scheduled ahead of streams with lower priority; and
      logic that issues the prefetch of the first prefetch stream in response to the prefetch being in a first position in the scheduling sequence and a current usage level of resources being at a level below a threshold level at and above which the prefetch cannot be issued.

21. The processor of claim 20, wherein the prefetch engine further comprises:
   logic that schedules the prefetch of first prefetch stream and the next prefetch of the next prefetch stream in an sequential order, relative to each other, corresponding to a time at which the first prefetch and the next prefetch are initiated and added to the scheduling sequence, in response to the first prefetch stream having a same priority as a next prefetch stream;
   logic that dynamically determines whether to throttle issuance of the prefetch of the first prefetch stream based on a current usage level of resources relevant to completing the prefetch; and
   logic that, in response to the current usage level of the resources being at least at the threshold level at which the prefetch cannot be issued, interrupts the scheduling of the prefetch by performing one of: discarding the prefetch from the scheduling sequence; and pausing the scheduling of the prefetch until the current usage level falls below the threshold level.

22. The processor of claim 20, wherein:
   said logic that monitors further comprises logic that:
      detects a usage parameter at the resource being monitored;
      forwards the usage parameter to a throttling facility;
      receives the usage parameter at the throttling facility;
      re-calculates a usage load indicator value based on the received usage parameter
      detects an occurrence of one or more late prefetches for the first prefetch stream; and
      tracks a level of idleness of the first prefetch stream;
   said logic that dynamically updates comprises logic that:
      responds to the detection of a preset threshold number of late prefetches by dynamically increasing the priority of the first prefetch stream to a higher priority; and
      responds to the level of idleness being greater than a threshold idleness level by dynamically decreasing the priority of the first prefetch stream to a lower priority; and
   said prefetch engine comprises logic that, in response to the priority of the first prefetch stream falling below a threshold priority point, automatically discards the prefetch stream, such that no further scheduling of prefetches occur for the first prefetch stream.

23. The processor of claim 20, wherein the prefetch engine further comprises logic that:
   detects when a prefetch scheduling queue is empty; and
   automatically triggers one or more prefetch streams to initiate a prefetch by placing the prefetch within the scheduling queue, wherein the automatically triggering further comprises:
   identifies one or more prefetch streams that have a highest priority among all available prefetch streams as possible streams for scheduling;
   checks the prefetch distance of each of the possible streams;
   removes streams among the possible streams whose prefetch distance is above a threshold allowed distance at which no further prefetching should be scheduled for the particular stream; and
   triggers placement of a prefetch into the scheduling queue by the possible streams whose prefetch distance is not above the threshold allowed distance.

* * * * *